United States Patent [19]

Akahira et al.

[11] Patent Number: 5,305,303
[45] Date of Patent: Apr. 19, 1994

[54] OPTICAL INFORMATION RECORDING MEDIUM

[75] Inventors: Nobuo Akahira, Yawata; Eiji Ohno, Hirakata; Kenichi Nishiuchi, Moriguchi; Kenichi Nagata, Mino; Noboru Yamada, Hirakata, all of Japan

[73] Assignee: Matsushita Electric Industrial Co., Ltd., Osaka, Japan

[21] Appl. No.: 765,515

[22] Filed: Sep. 25, 1991

[30] Foreign Application Priority Data

Sep. 25, 1990 [JP] Japan .................. 2-255830

[51] Int. Cl.$^5$ .................. G11B 7/24
[52] U.S. Cl. .................. 369/275.4; 430/290; 430/523; 430/945
[58] Field of Search ............ 369/286, 288, 283, 275.2, 369/275.1, 275.4; 428/694 ML, 900; 430/290, 291, 523, 945

[56] References Cited

U.S. PATENT DOCUMENTS 4,451,915 5/1984 LaBudde et al. .................. 369/288

Primary Examiner—Paul M. Dzierzynski
Assistant Examiner—Don Wong
Attorney, Agent, or Firm—Wenderoth, Lind & Ponack

[57] ABSTRACT

An optical information recording medium comprising: a substrate; a recording film in which an optically detectable amount is subjected to change; and at least one additional layer; the recording film and the additional layer being provided on the substrate; information being recorded by partially changing the recording film through irradiation of a laser beam thereto and being reproduced by optically detecting change of the optically detectable amount; the recording film being made of material assuming a plurality of states having different optical constants, respectively; physical conditions of the additional layer being selected such that a differential coefficient of the optically detectable amount relative to the optical con- stants is small in at least one of the states.

11 Claims, 2 Drawing Sheets

OPTICAL INFORMATION RECORDING MEDIUM

BRACKGROUND OF THE INVENTION

The present invention relates to an optical information recording medium in which information is recorded at high density by using an energy beam such as light, heat, etc. so as to be reproduced through its optical change.

When a laser beam is converged by a lens system, a small light spot whose diameter is on the order of its wavelength can be produced. Thus, even if output of a light source is small, it is possible to produce a beam spot having high energy density per unit area. By irradiating this beam spot over a substance, a minute region of the substance can be changed and the change of the minute region can be read out. A device utilizing such phenomena is an optical information recording medium (hereinbelow, referred to as an "optical recording medium" or simply as a "recording medium").

A known optical recording medium is basically constituted by a substrate having a flat surface and a recording film provided on the substrate such that state of a certain property in the recording film changes upon irradiation of a laser spot beam over the recording film. Recording and reproduction of signals are performed as follows. Namely, a disklike medium is displaced by a rotary means such as a motor or a translational means and a laser beam is irradiated over the recording film so as to be converged on the surface of the recording film. At this time, focus control is usually performed such that the laser beam is converged on the surface of the recording film. Thus, temperature of the recording film rises through absorption of the laser beam. When output of the laser beam is increased beyond a threshold value in accordance with information to be recorded, state of the recording film partially changes such that the information is recorded in the recording film. This threshold value is a quantity which depends on thermal characteristics of the substrate, velocity of the medium relative to the beam spot, etc. in addition to characteristics of the recording film itself.

At the time of reproduction, a laser beam spot having an output far lower than the above mentioned threshold value is irradiated over a recorded portion of the recording film such that the information is reproduced by detecting that any optical characteristics such as intensity of transmitted light, intensity of reflected light, their polarization directions, etc. differ between the recorded portion and an unrecorded portion of the recording film. At this time, tracking control is usually performed such that the laser beam can accurately follow the sequential changes of state of the recording film caused for recording the information in the recording film. Alternatively, by preliminarily forming, for example, a plurality of grooves on the substrate, a tracking guide is provided on the substrate such that recording and reproduction of the information are performed through tracking control based on the tracking guide.

Examples of application of such optical recording medium include an optical recording disk for video image files and document files and an optical recording disk for external storages (data files) for computers. Meanwhile, a card-like or tapelike optical recording medium is also proposed.

Various recording types and recording medium materials used therefor, for example, ablative recording and magnetooptical recording, etc. are proposed. In addition to the above mentioned recording media, there is a phase change type recording medium which is subjected to optical changes through change of its crystalline structure without being deformed. The phase change type recording medium has several advantages over other recording media. Firstly, since recording is performed by only irradiating a laser beam over the recording medium, an external magnetic field is not required to be applied to the recording medium in contrast with the magnetooptical recording medium and thus, a recording apparatus is simplified in structure. Secondly, in comparison with the magnetooptical recording medium in which signals are reproduced by detecting directions of polarization of light, signals are reproduced by detecting changes of reflected light intensity due to changes of reflectance of the recording film, and then the amount of signals are large and the signals have excellent signal-to-noise ratio. Furthermore, since the phase change type recording medium is not subjected to deformation, rewritable function can be obtained that not only recorded information is erased but new signals are recorded through reversible changes of a plurality of states of the recording medium. Meanwhile, since the phase change type recording medium is not subjected to deformation, a protective layer can be closely provided on the recording medium. Hence, in the phase change type recording medium, a complicated hollow structure called "air-sandwich structure" is not required to be employed in contrast with the ablative recording medium, thereby resulting in simple construction and high reliability.

Such features of the phase change type recording medium result from the fact that optical constants of the material, more specifically, its complex refractive index having refractive index at its real part and extinction coefficient at its imaginary part changes. Therefore, also in other recording media than the phase change type recording medium, the same features as those of the phase change type recording medium may be obtained if the recording media have a recording mechanism based on changes of optical constants. As examples of such recording media, a recording medium based on photochromic phenomenon of organic materials is known, while a recording medium based on, so to speak, alloying recording in which a film composed of a plurality of material layers is molten so as to be alloyed such that optical constants are substantially changed is proposed in "Proceedings of SPIE, Vol. 529, pp76-82 (1989)".

As materials used for the phase change type recording medium, a film of amorphous chalcogenide is known, while an oxide film mainly consisting of Te-$TeO_2$ is proposed in U.S. Pat. No. 3,971,874 or a film mainly consisting of Te-$TeO_2$-Pd is proposed in U.S. Pat. No. 4,624,914. In these films, recording is performed through changes of at least one of extinction coefficient and refractive index of the film upon irradiation of a laser beam thereto and amplitude of transmitted light or reflected light changes at the irradiated location such that signals are reproduced by detecting quantity of transmitted light or reflected light leading to a detection system.

Since the phase change type recording medium is not subjected to deformation as described above, recorded signals can be erased if reversible changes of states of the recording medium are possible. As materials enabling reversible phase change, Ge-Te-Sb-S series material is known from U.S. Pat. No. 3,530,441, Te-O-Ge-Sb series material is known from Japanese Patent Laid-Open Publication No. 59-185048, Te-O-Ge-Sb-Au series material is known from U.S. Pat. No. 4,939,013 and Ge-Sb-Te series material is known from Japanese Patent Laid-Open Publication No. 62-209742. As two states between which these materials reversibly change, an amorphous (vitreous or non-crystalline) state and a crystalline state exist stably. Generally, recording and erasure in the phase change type recording medium are performed in the following manner. Namely, when the film is heated upon irradiation of a laser beam thereto so as to be molten and then, is quenched in the course of cooling of the film upon completion of irradiation of the laser beam thereto, the recording medium is set to the amorphous state. Likewise, when a laser beam is irradiated over the film so as to heat the film to a temperature lower than a melting point but sufficient for crystallization, the recording medium is set to the crystalline state. Meanwhile, even in the case where the film is heated above the melting point, the recording medium is set to the crystalline state if the film is gradually cooled due to failure to create sufficient quenching conditions.

Generally, the film material used for the phase change type recording medium is amorphous as deposited. Usually in a write once type film, this amorphous state is utilized for an unrecorded state and the crystalline state is utilized for a recorded state. Meanwhile, in an erasable type film, the amorphous state and the crystalline state may be arbitrarily utilized for the recorded state and the erased state of information, respectively or oppositely the erased state and the recorded state, respectively. However, in the erasable type film, the amorphous state is generally utilized for the recorded state.

In a changeable optical constant type recording medium, when optical constants change due to minute changes of the material, optically detectable amounts such as reflectance, transmittance, etc. change minute accordingly. For example, material of the changeable optical constant type recording medium assumes two stable states having different optical constants and two-value recording is performed by allotting the states to the recorded state and the unrecorded state, respectively. In this example, when the optically detectable amounts change minutely due to minute changes of either one of the states, background noises are produced in the case of the unrecorded state and recording is performed nonuniformly in the case of the recorded state. Therefore, in both of the cases, noises are produced in reproduction signals obtained from the optically detectable amounts, thus resulting in degradation of recording quality.

As a concrete example, the phase change type optical recording medium has such a drawback that when recorded signals are erased, the recorded signals are not erased completely, thereby resulting in residual signals. Causes of production of the residual signals have not been completely determined. However, it is ascertained that in the erased state, i.e. in the crystalline state, minute distribution of reflectance dependent upon hysteresis of the previous recorded state exists on the surface of the film. It is considered that this phenomenon occurs because there are minute changes of optical constants due to minute differences of the crystalline state.

Thus, at a location in which erasing has been performed repeatedly, satisfactory signal quality can be obtained in the case of reproduction or rewriting of digital signals, especially in pulse position modulation (PPM) recording method in which a central position of a recording mark is modulated in accordance with signals to be recorded but undesirable jitter of reproduction signals is increased in the case of reproduction or rewriting of analog signals, especially in pulse width modulation (PWM) recording method in which a length of a recording mark is modulated in accordance with signals to be recorded.

SUMMARY OF THE INVENTION

Accordingly, an essential object of the present invention is to provide a changeable optical constant type recording medium which has uniform optical characteristics in a recorded state and an unrecorded state and is less subjected to noises.

Another important object of the present invention is to provide a rewritable type phase change recording medium which has a large erasability by minimizing residual signals.

In order to accomplish these objects of the present invention, an optical information recording medium embodying the present invention comprises: a substrate; a recording film in which an optically detectable amount is subjected to change; and at least one additional layer; the recording film and the additional layer being provided on the substrate; wherein information is recorded by partially changing the recording film through irradiation of a laser beam thereto and is reproduced by optically detecting change of the optically detectable amount; wherein the recording film is made of material assuming a plurality of states having different optical constants, respectively; wherein physical conditions of the additional layer are selected such that a differential coefficient of the optically detectable amount relative to the optically constants is small in at least one of the states. Preferably, the physical conditions of the additional layer are selected such that the optically detectable amount assumes a maximum value or a minimum value relative to the optical constants in at least one of the states.

In a concrete example, the recording film and a transparent layer are provided on the substrate and thicknesses of the recording film and the transparent layer are selected such that the optically detectable amount assumes the maximum value or the minimum value relative to the optical constants in at least one of the states.

By employing the above mentioned arrangement, the optically detectable amount hardly changes even when the optical constant changes minutely due to minute change of the state.

More specifically, in a phase change type recording medium, since differential coefficient of reflectance relative to the optical constant is small or zero. Thus, even if the optical constant changes due to presence of minute differences in a crystalline state, change of reflectance is minute or reflectance hardly changes. Therefore, since the differences in the crystalline state are not detected optically, noises made by residual signals are not produced.

In accordance with the present invention, a changeable optical constant type recording medium has uniform optical characteristics in a recorded state and an unrecorded state and is less subjected to noises.

Furthermore, in accordance with the present invention, a rewritable type phase change recording medium has a large erasability by minimizing residual signals.

BRIEF DESCRIPTION OF THE DRAWINGS

These objects and features of the present invention will become apparent from the following description taken in conjunction with the preferred embodiment thereof with reference to the accompanying drawings, in which.

DETAILED DESCRIPTION OF THE INVENTION

Figure 1:
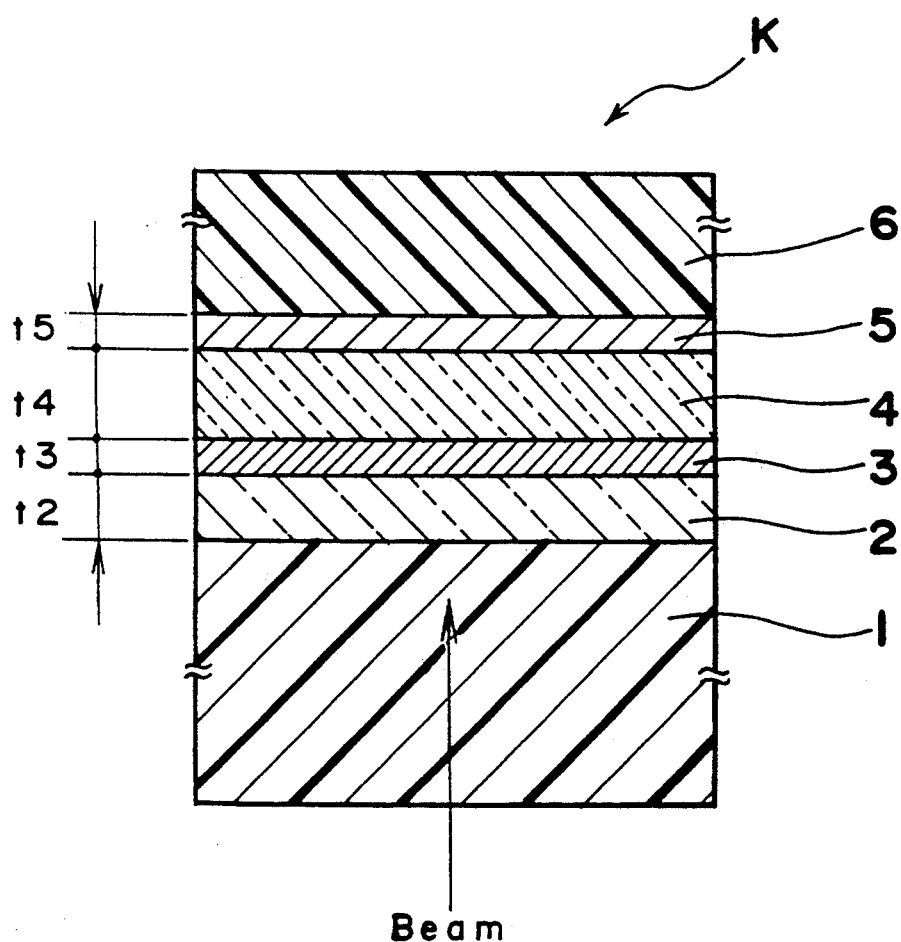
FIG. 1 is a schematic sectional view of an optical information recording medium according to one embodiment of the present invention.

Referring now to the drawings, there is shown in FIG. 1, an optical information recording medium K according to one embodiment of the present invention. The recording medium K includes a substrate 1, a first transparent layer 2, a recording film 3, a second transparent layer 4 and a reflective layer 5 which are stacked on one another in this order. The first and second transparent layers 2 and 4 are made of dielectric. Furthermore, a transparent protective layer 6 is closely provided on the reflective layer 5 as shown in FIG. 1. However, the protective layer 6 may be eliminated from the recording medium K. In this case, air having a refractive index of 1.0 acts as the protective layer 6. Therefore, the arrangement having no protective layer 6 may be regarded as being optically identical with the arrangement having the protective layer 6 and thus, achieves the same effects as those of the arrangement having the protective layer 6. Since the first transparent layer 2 has an optical function, it is preferable that the first transparent layer 2 is made of material which has a refractive index different from that of the substrate 1.

Supposing that the recording film 3 has a thickness t3, the first and second transparent layers 2 and 4 have thicknesses t2 and t4, respectively and the reflective layer 5 has a thickness t5, optically detectable amounts can be adapted to assume a maximum value or a minimum value with respect to optical constants by properly selecting the thicknesses t2 to t5. However, transmittance of material of the reflective layer 5 is small. Therefore, if the thickness t5 of the reflective layer 5 is so set as to have reflective function, optical characteristics do not depend upon the thickness t5 of the reflective layer 5 so much. Accordingly, practically, the thicknesses t2 to t4 are selected.

The substrate 1 is formed by a transparent and smooth flat plate made of glass, resin, etc. The substrate 1 may be formed, on its surface, with a plurality of grooves acting as a tracking guide. The protective layer 6 is obtained by coating and drying resin dissolved in solvent or by bonding a plastic resin plate with adhesive.

The recording film 3 is made of material which effects phase change between amorphous state and crystalline state, for example, chalcogenide of SbTe series, InTe series, GeTeSn series, SbSe series, TeSeSb series, SnTeSe series, InSe series, TeGeSnO series, TeGeSnAu series, TeGeSnSb series, TeGeSb series, etc. The recording film 3 may be made of oxide of Te-TeO$_2$ series, Te-TeO$_2$-Au series, Te-TeO$_2$-Pd series, etc. Furthermore, the recording film 3 may be made of material which effects phase change between crystalline states, e.g. metallic compound of AgZn series, InSb series, etc.

Dielectric material of the first transparent layer 2 includes oxide such as SiO$_2$, SiO, TiO$_2$, MgO, GeO$_2$, etc., nitride such as Si$_3$N$_4$, BN, AlN, etc., sulfide such as ZnS, ZnSe, ZnTe, PbS, etc. or these mixture. The reflective layer 5 is made of material mainly consisting of Au, Al, Cu, etc. or is formed by a dielectric multi-layer having a large reflectance at a predetermined wavelength.

These materials of the components 1 to 6 can be prepared by vacuum evaporation method using a multi-source or sputtering method using a mosaic complex target.

COMPARATIVE EXAMPLE

As a comparative example, an optical information recording medium having the construction of FIG. 1 is provided. The recording film 3 is made of phase change material having a composition of Ge$_2$Sb$_2$Te$_5$. The recording film 3 is formed in an amorphous state by electron beam evaporation method using three evaporation sources for Ge, Sb and Te, respectively. Measurement of optical constants of the recording film 3 in an amorphous state by depositing only Ge$_2$Sb$_2$Te$_5$ on a quartz glass plate has revealed that complex refractive index n+ki at a wavelength of 830 nm is 4.8+1.3i. After the recording film 3 has been annealed in atmosphere of inert gas at 300° C. for 5 min. so as to be set to a crystalline state (annealed state), complex refractive index changes to 5.8+3.6i.

The substrate 1 is formed by a polycarbonate resin disk having a refractive index of 1.58 at a wavelength of 830 nm. The substrate 1 has a thickness of 1.2 mm and a diameter of 200 mm and is preliminarily formed with tracking grooves of 0.6 μm in width and 65 nm in depth. The first transparent layer 2 which is made of a dielectric mixture of ZnS-SiO$_2$ having a refractive index of 2.10 is evaporated on the substrate 1 by electron beam evaporation method until the thickness t2 reaches 148 nm. Subsequently, the recording film 3 made of Ge$_2$Sb$_2$Te$_5$ is likewise evaporated on the first transparent layer 2 until the thickness t3 reaches 40 nm. Furthermore, the second transparent layer 4 made of ZnS-SiO$_2$ is similarly evaporated on the recording film 3 until the thickness t4 reaches 198 nm. In addition, the reflective layer 5 made of Au having a complex refractive index of 0.20+5.04i is evaporated on the second transparent layer 4 by electron beam evaporation method until the thickness t5 reaches 50 nm. Moreover, the protective layer 6 which is formed by a polycarbonate resin disk in the same manner as the substrate 1 is bonded to the reflective layer 5 with adhesive, whereby the optical information recording medium of comparative example is obtained.

While this recording medium of comparative example is being rotated at a linear velocity of 10 m/sec., a laser diode beam having a wavelength of 830 nm is focussed on the recording film 3 through its convergence by a lens system having a numerical aperture (N.A.) of 0.5 so as to be irradiated over the tracking grooves by tracking control. Initially, the laser beam is irradiated at a continuous output of 8.5 mW on the recording film 3 so as to uniformly crystallize the recording film 3 along the tracking grooves. A laser beam modulated at a modulation duty of 50% at a single frequency of 5 MHz is irradiated over the tracking grooves at a write power of 19 mW on the recording film 3 so as to partially set the recording film 3 to an amorphous state such that marks are formed for the purpose of performing recording. Furthermore, a laser beam is irradiated at a continuous output (read power) of 1 mW and its reflected light is detected by a photodetector so as to perform reproduction. Thus, quantity of reflected light decreases to about one-third at the recording marks and reproduction signals of 5 MHz are obtained. Measurement of the reproduction signals by a spectrum analyzer has revealed that the reproduction signals have a carrier to noise ratio (CNR) of 56 dB (resolution bandwidth of 30 kHz). Moreover, a laser beam is irradiated over the tracking grooves at a continuous output of 8.5 mW on the recording film 3 so as to crystallize the marks in the amorphous state such that erasure is performed. When the reproduction signals are measured in this state by using the same read power, a frequency component of 5 MHz has a CNR of 31 dB, namely, residual signals of 31 dB are observed.

If difference between the CNR in the recorded state and that of the residual signals is defined as erasability, erasability in this case assumes 25 dB (=56−31). Similar experiments on erasability performed by changing the erasure power have shown that erasability of 24 to 28 dB is obtained when the erasure power ranges from 7 to 11 mW. It has been also observed that an average value of quantity of reflected light in this state is about 1% larger than that of the initial uniform crystallization step.

In order to examine causes of production of the residual signals, the recording medium is disassembled and the recording film 3 is stripped from the recording medium. When crystalline state of this recording film 3 is observed by using a transparent electron microscope having a magnification of about 15,000, crystalline grains having a substantially identical grain size of about 50 nm are uniformly distributed on the tracking grooves in the initial crystallized state. Then, when the grooving tracks in the recorded state are observed, elliptic amorphous marks are observed and crystalline grains having a grain size of about 100 nm surround the amorphous marks. Furthermore, when the tracking grooves in the erased state are observed, crystalline grains having a grain size of about 50 nm identical with that of the initial crystallized state are distributed at locations of the amorphous marks and are elliptically surrounded by crystalline grains having a grain size of about 100 nm. More extensive analysis has revealed that the respective crystals are of identical crystalline structure and do not have orientation. It is considered that crystals having large grain size correspond to a phenomenon that the recording film molten by the write power is set to a crystalline state at the time of recording without being set to an amorphous state, while crystals having small grain size correspond to a phenomenon that the recording film is set to a crystalline state in solid phase without being molten.

From the foregoing, it is concluded that a crystalline state having different grain sizes exists, which is a cause of production of residual signals. Mechanism in which reproduction signals are affected by difference of grain sizes has not been necessarily clarified but may be considered as follows. Optical characteristics (optical constants) of material depend upon electronic state of the material. Since its crystals are of identical crystalline structure and do not have orientation, it is considered that atoms in the crystals have crystalline electronic state identically, while not only long distance order but short distance order of atoms present at grain boundary is not complete. Electronic state of the atoms present at grain boundary should approximate to that of the amorphous state rather than the crystalline state. Meanwhile, as grain size of crystals becomes smaller, area of grain boundary per unit volume is increased and thus, rate of the atoms present at grain boundary is increased. Therefore, it is considered that average optical constants becomes approximate to those of the amorphous state from those of the crystalline state as grain size is made smaller. It follows that optical constants change due to difference of grain size, so that reflectance of the recording medium changes partially, which is detected as reproduction signals. Hence, even in the same crystalline state, optical constants change minutely due to slight difference of grain size, thereby affecting quality of reproduction signals.

Figure 2:
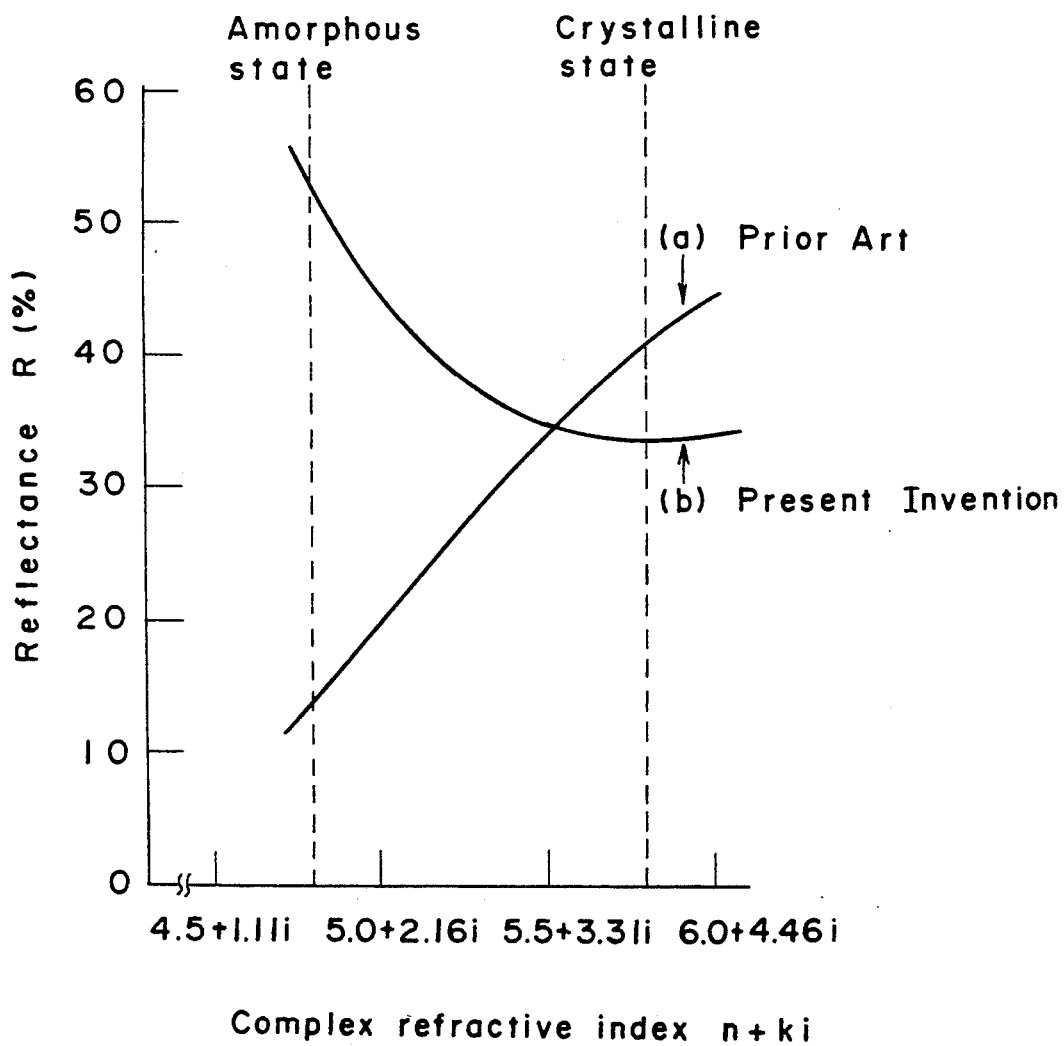
FIG. 2 is a graph showing dependence of reflectance of the recording medium of FIG. 1 upon optical constant in comparison with that of a prior art recording medium.

In order to further this argument, relation between optical constant and reflectance in the above mentioned recording medium of comparative example is calculated as shown by the curve (a) in FIG. 2. In FIG. 2, reflectance is calculated from complex refractive index and thickness of each layer by matrix method as described in a book entitled "Wave Optics" (1971), Chap. 3 and written by Hiroshi Kubota. In this connection, the substrate 1 and the protective layer 6 are regarded as having infinite thickness by neglecting effect of interface between the substrate 1 and air and interface between the protective layer 6 and air, while reflectance R of the recording film 3 is calculated as a ratio of intensity of light reflected into the substrate 1 to intensity of light incident upon the recording film 3 from the substrate 1. It is assumed that complex refractive index of the recording film 3 changes linearly between the amorphous state (deposited state) and the crystalline state (annealed state). As will be seen from FIG. 2, supposing that difference between the optical constant in the crystalline state and that in the amorphous state is 1, reflectance changes about 2% when the optical constant changes by 0.05. Namely, if a state partially exists in which the optical constant approaches the amorphous state from the crystalline state by 1/20, noises (residual signals) of about 2% are produced. Since difference between reflectance in the crystalline state and that in the amorphous state is about 24%, this corresponds to an erasability of 22 dB. Although propriety of an assumption that the optical constant approaches the amorphous state from the crystalline state by 1/20 is open to controversy, it will be possible to analyze data by using such a model.

PRESENT INVENTION

The recording medium K of the present invention is produced in the same manner as in the above mentioned recording medium of comparative example. Namely, the substrate 1 is formed by a polycarbonate resin disk. The first and second transparent layers 2 and 4 are made of $ZnS-SiO_2$. The recording film 3 is made of $Ge_2Sb_2Te_5$, while the reflective layer 5 is made of Au. Furthermore, the protective layer 6 is formed by a polycarbonate resin disk in the same manner as the substrate 1 and is bonded to the reflective layer 5 with adhesive. On the basis of the above mentioned model in which the optical constant changes minutely on the curve connecting the optical constant in the crystalline state and the optical constant in the amorphous state, thickness combinations of the layers are obtained in which differential coefficient of reflectance relative to optical constant assumes a minimum value of 0, i.e. an extremal value at the optical constant in the crystalline state. When dependence of reflectance upon optical constant is calculated as shown in FIG. 2 by changing thicknesses of the layers of the recording medium K by the use of complex refractive index of material of each layer such that thickness combinations of the layers, in which the optical constant in the crystalline state assumes an extremal value, are searched by using a computer, prospects shown in Table 1 below are obtained. Table 1 shows that in all thickness combinations of the layers, in which the thickness t5 of the reflective layer 5 is set to 50 nm at a wavelength of 830 nm and the thickness t3 of the recording film 3 is changed at an interval of 5 nm and the thicknesses t2 and t4 of the first and second transparent layers 2 and 4 are changed at an interval of 12.35 nm, reflectance assumes a minimum value at an optical constant of 5.8+3.6i in the crystalline state and its quadratic differential value is especially small.

TABLE 1

| λ = 830 nm, t5 = 50 nm | | | | | |
|---|---|---|---|---|---|
| t2 (nm) | t3 (nm) | t4 (nm) | Ra (%) | Rc (%) | dR (%) |
| 49 | 20 | 111 | 61.8 | 45.4 | −16.3 |
| 111 | 20 | 124 | 56.5 | 39.4 | −17.1 |
| 185 | 25 | 124 | 73.2 | 62.0 | −11.2 |
| 124 | 30 | 124 | 63.0 | 48.7 | −12.7 |
| 136 | 30 | 124 | 66.1 | 54.2 | −11.8 |
| 148 | 30 | 124 | 69.0 | 57.8 | −11.3 |
| 12 | 35 | 111 | 69.8 | 58.7 | −11.1 |
| 89 | 35 | 111 | 54.3 | 40.5 | −13.8 |
| 198 | 35 | 111 | 70.3 | 60.0 | −10.4 |
| 87 | 45 | 124 | 52.6 | 33.6 | −19.0 |
| 173 | 45 | 136 | 69.9 | 53.4 | −16.5 |

In Table 1, "Ra" denotes reflectance at the optical constant of 4.8+1.3i in the amorphous state, "Rc" denotes reflectance at the optical constant of 5.8+3.6i in the crystalline state and "dR" denotes difference between Ra and Rc, i.e. (Rc−Ra). As is apparent from Table 1, by selecting thicknesses of the recording film 3 and the first and second transparent layers 2 and 4, there are a plurality of thickness combinations in which reflectance assumes an extremal value at the optical constant in the crystalline state and difference in refractive index between the amorphous state and the crystalline state is sufficiently large. Meanwhile, even if thicknesses of the layers change minutely from the values shown in Table 1, the same effects can be achieved because differential coefficient of reflectance relative to optical constant is small. Therefore, the thickness of the layers may fall in the vicinity of the values shown in Table 1.

When t2=87 nm, t3=45 nm and t4=124 nm are selected as one example of the thickness combinations in Table 1, calculated value of relation between optical constant and reflectance is shown by the curve (b) in FIG. 2. As is seen from FIG. 2, even if optical constant changes by 0.05 when difference in optical constant between the crystalline state and the amorphous state is set to 1, reflectance changes less than 0.1%. Namely, even if a state partially exists in which the optical constant approaches the amorphous state from the crystalline state by 1/20, noises (residual signals) of merely less than 0.1% are produced. Since the difference dR is about 19% at this time, this corresponds to an erasability of 46 dB.

Based on the above results, the following experiments are conducted. In the same manner as the recording medium of comparative example, the substrate 1 is formed by a polycarbonate resin disk of 1.2 mm in thickness and 200 mm in diameter, on which tracking grooves having a width of 0.6 μm and a depth of 65 nm are formed. Then, as the first transparent layer 2, dielectric mixture of ZnS-SiO$_2$ is evaporated on the substrate 1 until the thickness t2 of the first transparent layer 2 reaches 87 nm. Subsequently, as the recording film 3, Ge$_2$Sb$_2$Te$_5$ is formed on the first transparent layer 2 in the same manner as the recording medium of comparative example until the thickness t3 of the recording film 3 reaches 45 nm. Furthermore, as the second transparent layer 4, ZnS-SiO$_2$ is likewise evaporated on the recording film 3 until the thickness t4 of the second transparent layer 4 reaches 124 nm. Moreover, as the reflective layer 5, Au is formed on the second transparent layer 4 by electron beam evaporation method until the thickness t5 of the reflective layer 5 reaches 50 nm. In addition, as the protective layer 6, a polycarbonate resin disk identical with that of the substrate 1 is bonded to the reflective layer 5 with adhesive, whereby the recording medium is obtained.

While this recording medium of the present invention is being rotated at a linear velocity of 10 m/sec., a laser diode beam having a wavelength of 830 nm is focussed on the recording film 3 through its convergence by a lens system having a numerical aperture of 0.5 so as to be irradiated over the tracking grooves by tracking control. Initially, the laser beam is irradiated at a continuous output of 12 mW on the recording film 3 so as to uniformly crystallize the recording film 3 along the tracking grooves. A laser beam modulated at a modulation duty or 50% at a single frequency of 5 MHz is irradiated over the tracking grooves at a write power of 20 mW on the recording film 3 so as to partially set the recording film 3 to the amorphous state such that marks are formed for the purpose of performing recording. Furthermore, a laser beam is irradiated at a read power of 1 mW and its reflected light is detected by a photodetector so as to perform reproduction. Thus, quantity of reflected light increases to about 3/2 at the recording marks and reproduction signals of 5 MHz are obtained. Measurement of the reproduction signals by a spectrum analyzer has revealed that the reproduction signals have a CNR of 51 dB. Moreover, a laser beam is irradiated over the tracking grooves at a continuous output of 12 mW on the recording film 3 so as to crystallize the marks in the amorphous state such that erasure is performed. When the reproduction signals are measured in this state by using the same write power, a frequency component of 5 MHz is obtained, namely, residual signals have a CNR of 14 dB. By using the earlier mentioned definition of erasability, an erasability of 37 dB is obtained. Similar experiments on erasability performed by changing the erasure power have shown that erasability of 34 to 39 dB is obtained when the erasure power ranges from 10 to 14 mW. Difference between an average value of quantity of reflected light in this state and that of the initial uniform crystallization step falls within measuring error.

From the above results, it has been also experimentally confirmed that by employing a scheme in which the thicknesses of the recording film and the first and second transparent layers are selected such that reflectance assumes a maximum value or a minimum value relative to optical constant, erasability is improved, in other words, noises in the erased crystalline state are reduced.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. An optical information recording medium comprising:
    a substrate;
    a recording film layer in which an optically detectable characteristic is subjected to change, said optically detectable characteristic being selected from the group consisting of (a) intensity of transmitted light (transmittance) (b) intensity of reflected light (reflectance) and (c) polarization direction; and
    at least one additional layer;
    said recording film layer and said additional layer being provided on said substrate;
    wherein information is recorded by partially changing said recording film layer through irradiation of a laser beam thereto and is reproduced by optically detecting change of the optically detectable characteristic;
    wherein said recording film layer is made of material assuming a plurality of states having different optical constants, respectively;
    wherein physical conditions of said additional layer are selected such that a differential coefficient of the optically detectable characteristic relative to the optical constants is minimized in at least one of the states.

2. An optical information recording medium comprising:
    a substrate;
    a recording film layer in which an optically detectable characteristic is subjected to change, said optically detectable characteristic being selected from the group consisting of (a) intensity of transmitted light (transmittance) (b) intensity of reflected light (reflectance) and (c) polarization direction; and
    at least one additional layer;
    said recording film layer and said additional layer being provided on said substrate;
    wherein information is recorded by partially changing said recording film layer through irradiation of a laser beam thereto and is reproduced by optically detecting change of the optically detectable characteristic;
    wherein said recording film layer is made of material assuming a plurality of states having different optical constants, respectively;
    wherein physical conditions of said additional layer are selected such that the optically detectable characteristic assumes a maximum value or a minimum value relative to the optical constants in at least one of the states.

3. An optical information recording medium comprising:
    a substrate;
    a recording film in which an optically detectable characteristic is subjected to change by irradiation of at least a laser beam thereto, said optically detectable characteristic being selected from the group consisting of (a) intensity of transmitted light (transmittance) (b) intensity of reflected light (reflectance) and (c) polarization direction; and
    a transparent layer member;
    said recording film and said transparent layer member being provided on said substrate;
    wherein information is recorded by partially changing said recording film and is reproduce by optically detecting change of the optically detectable characteristic;
    wherein said recording film is made of material assuming a plurality of states having different optical constants, respectively;
    wherein when the optically detectable characteristic assumes a maximum value or a minimum value relative to the optical constants in at least one of the states in the case where said recording film and said transparent layer member are, respectively, set to specific thicknesses, thicknesses of said recording film and said transparent layer member are so selected to substantially have said specific thicknesses, respectively.

4. The optical information recording medium as claimed in claim 3, further comprising:
    a reflective layer;
    said transparent layer member including a first transparent layer and a second transparent layer;
    said first transparent layer having a refractive index different from that of said substrate and being provided on said substrate such that said recording film is provided on said first transparent layer;
    said second transparent layer being provided on said recording film such that said reflective layer is provided on said second transparent layer;
    the optically detectable characteristic being reflectance of light used for reproduction;
    wherein when the optically detectable characteristic assumes a maximum value or a minimum value relative to the optical constants in at least one of the states in the case where said recording film, said first and second transparent layers and said reflective layer are, respectively, set to specific thicknesses, thicknesses of said recording film, said first and second transparent layers and said reflective layer are so selected as to substantially have said specific thicknesses, respectively.

5. The optical information recording medium as claimed in claim 4, wherein said substrate is formed by a transparent and smooth flat plate.

6. The optical information recording medium as claimed in claim 4, wherein said recording film is made of material which effects phase change between an amorphous state and a crystalline state.

7. The optical information recording medium as claimed in claim 6, wherein said recording film is made of chalcogenide of one of SbTe series, InTe series, GeTeSn series, SbSe series, TeSeSb series, SnTeSe series, InSe series, TeGeSnO series, TeGeSnAu series, TeGeSnSb series and TeGeSb series.

8. The optical information recording medium as claimed in claim 4, wherein said first and second transparent layers are made of one of oxide such as $SiO_2$, SiO, $TiO_2$, MgO and $GeO_2$, nitride such as $Si_3N_4$, BN and AlN, sulfide such as ZnS, ZnSe, ZnTe and PbS and a mixture of the oxide, the nitride and the sulfide.

9. The optical information recording medium as claimed in claim 4, wherein said reflective layer is made of material mainly consisting of one of Au, Al and Cu or is formed by a dielectric multi-layer having a large reflectance at a predetermined wavelength.

10. The information recording medium as claimed in claim 4, further comprising: a protective layer which is closely provided on said reflective layer.

11. The optical information recording medium as claimed in claim 5, wherein said substrate is formed with a plurality of grooves acting as a tracking guide.

* * * * *